Aug. 5, 1952     G. V. WOODLING     2,605,804
CONTRACTIBLE RING SLEEVE LOCKING NUT
Filed Feb. 17, 1949
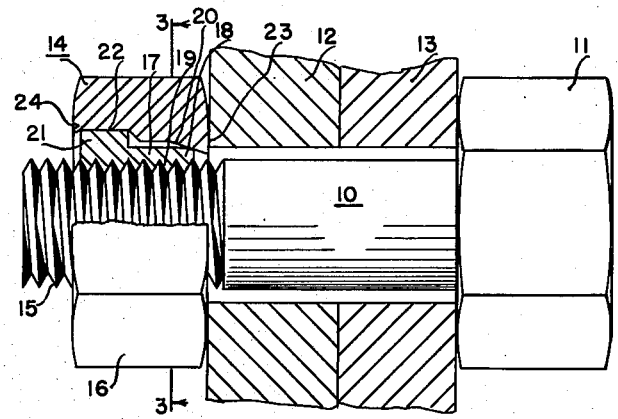
FIG. 1
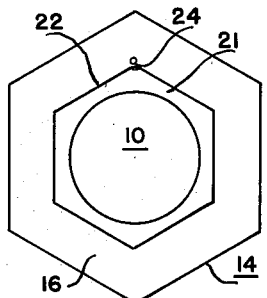
FIG. 2
FIG. 3
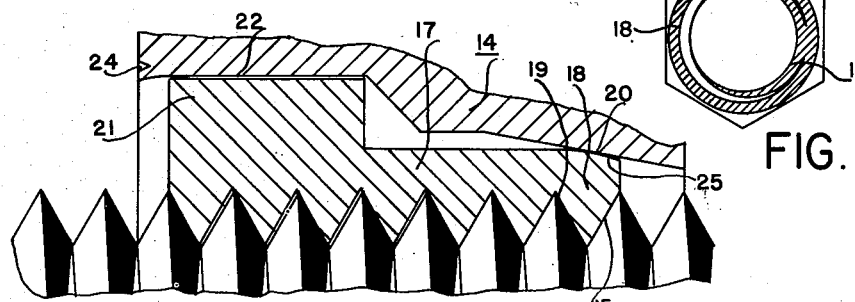
FIG. 4
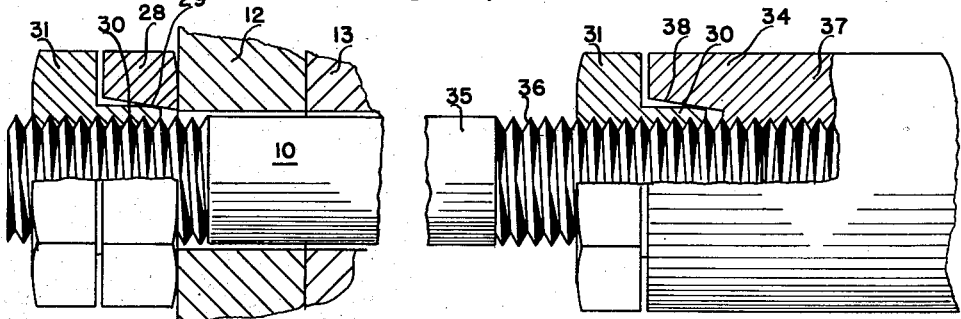
FIG. 5     FIG. 6
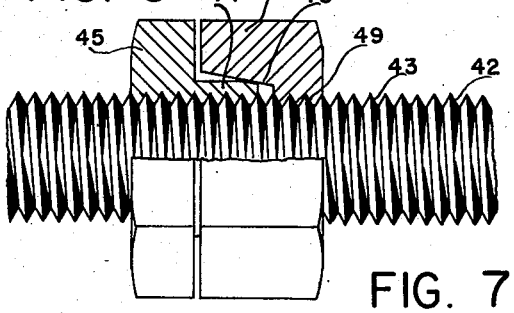
FIG. 7
INVENTOR.
George V. Woodling Patented Aug. 5, 1952

2,605,804

UNITED STATES PATENT OFFICE 2,605,804

CONTRACTIBLE RING SLEEVE LOCKING NUT

George V. Woodling, Cleveland, Ohio

Application February 17, 1949, Serial No. 76,907

1 Claim. (Cl. 151—19)

My invention relates in general to locking nuts and more particularly to locking nuts employing a resilient contractible ring sleeve for making locking engagement with the threadable element upon which the nut is turned.

An object of my invention is the provision of a locking nut having a contractible locking sleeve provided with a resilient solid ring end portion which cams into locking engagement with the threadable element upon which the nut is turned.

Another object of my invention is the provision of a contractible locking ring sleeve which remains alive and maintains resiliency between locking surfaces as the nut is tightened, as contrasted with prior art locking sleeves which remain dead or non-compliant when the nut is turned on tight.

Another object of my invention is the provision of a contractible ring sleeve locking nut whereby the contractible ring sleeve is cammed into locking engagement with the threadable element upon which the nut is turned and which springs back to release the threadable element upon the loosening of the locking nut.

Another object of my invention is the provision of a contractible ring sleeve which is preferably constructed of steel or other metal capable of being hardenable throughout its entire mass, and which resist collapsing when the nut is turned on tight.

Other objects and a fuller understanding of my invention may be had by referring to the following description and claim, taken in conjunction with the accompanying drawing, in which:

Figure 1 is a longitudinal cross-sectional view of a locking nut embodying the features of my invention;

Figure 2 is an end view of my locking nut;

Figure 3 is a cross-sectional view taken along the line 3—3 of Figure 1, but showing only the cross-sectional view of the contractible ring sleeve;

Figure 4 is a fragmentary enlarged view of the locking nut and showing principally the locking action of the contractible ring sleeve;

Figure 5 shows a modified form of my invention, and illustrates the contractible ring sleeve being integrally joined to the primary nut in which the contractible ring sleeve is cammed into an internal annular cam surface of a secondary nut;

Figure 6 is a further modification of the invention shown in Figure 5 and illustrates the contractible ring sleeve being integrally joined with a primary nut and in which the contractible ring sleeve is cammed into an internal annular cam surface of an actuating rod or other element; and Figure 7 is a further modified form of my invention and comprises primary and secondary nuts in which the primary nut is provided with the contractible ring sleeve that cams into an internal annular cam surface of the secondary nut.

With reference to Figures 1, 2, 3 and 4 of the drawing, my invention is illustrated in connection with a bolt 10 having a head 11 which is adapted to fasten two plates 12 and 13 together. As illustrated, the bolt 10 is provided with male threads 15 upon which my locking nut is adapted to be threaded. My locking nut is indicated generally by the reference character 14 and comprises a hexagonal annular body member 16 in which is non-rotatively mounted a locking sleeve 17. The bore of the locking sleeve 17 is provided with female threads 19 for threadably engaging the male threads 15 of the bolt 10. The locking sleeve 17 comprises at its left-hand end a hexagonal head 21 and at its right-hand end a relatively thin solid ring portion 18. As illustrated, the solid ring end portion 18 of the sleeve is adapted to be cammed into an internal annular cam surface 20 of the hexagonal nut or annular body member 16. The angle of the slope of the internal annular cam surface 20 may be in the neighborhood of 10°. The hexagonal head 21 of the sleeve is adapted to fit into a hexagonal socket 22 of the hexagonal annular body member 16. The non-rotative mounting of the head of the sleeve into the annular body member may be obtained by any suitable interlocking fit other than the hexagonal head and socket, such for example, as by interfitting longitudinal ribs or by eccentric head and socket assembly. The interfitting engagement between the hexagonal head 21 of the sleeve and the hexagonal socket 22 of the annular body member 16 provides a non-rotative connection between the sleeve and the annular body member so that when the annular body member 16 is turned with a tool the sleeve is likewise turned upon the threads 15 of the bolt 10.

As the annular body member 16 is turned on with a wrench the entire assembly of the locking nut moves to the right until the inside face 23 of the annular body member 16 engages the plate 12, at which point the sleeve is then drawn longitudinally to the right into the annular body member 16. The drawing of the sleeve into the annular body member 16 forces the outer cam surface 25 of the forward end of the sleeve into the internal annular cam surface 20 of the annular body member 16. The forcing of the forward end of the solid spring sleeve into the internal annular cam surface 20 operates to cam the solid ring sleeve end portion against the threads for making a locking engagement therewith. As the sleeve 17 is drawn into the annular body member 16 the hexagonal head of the sleeve moves longitudinally within the hexagonal socket 22 of the annular body member 16. In loosening my locking nut, it is only necessary to turn the hexagonal annular body member 16 in such direction as to cause the locking assembly to move away from the plate 12. After the hexagonal annular body member 16 has been unloosened for a partial turn or thereabout, it may be tapped with a suitable tool to loosen the camming action of the locking sleeve therein, after which the nut may be easily turned off without any drag being caused by the locking sleeve. The locking sleeve may be held inside of the annular body member 16 by providing a small punch indenture 24 to cause the edge of the hexagonal socket 22 to provide a stop so that the locking sleeve 17 cannot be readily removed from the inside of the annular body member 16.

The locking sleeve is preferably constructed of steel or other material capable of being hardenable and tempered throughout its entire mass to render it hard and resilient. I find that steel known as 4140, heat-treated throughout its entire mass and tempered to a hardness value of approximately 30 to 50 Rockwell, is satisfactory for my sleeve. Experience shows that the Rockwell value in the neighborhood of 45 is preferable. A heat-treated sleeve resists collapsing so that the solid ring end portion 18 springs back to release the threadable locking engagement of the bolt when the locking nut is unturned. One principal feature of the locking sleeve is that the solid ring end portion 18 remains alive and maintains resiliency between the locking surfaces, as distinguished from prior art sleeves wherein the sleeves become substantially dead or non-compliant when the locking nut is turned on tight. By reason of the fact that the sleeve remains alive and maintains strong supported resiliency resulting from the solid ring end portion, the locking engagement always remains strong whereby it is not easily shaken loose by vibration or other jarring action of the machine upon which the locking nut is mounted. The wall thickness of the solid forward end of the ring sleeve is such that it may be cammed inwardly notwithstanding the fact that the sleeve is constructed of hard and tough alloy steel which has been heat-treated to render it hard and resilient. The hexagonal body member 16 may be made of free machining steel and case hardened so that the solid ring end portion 18 of the sleeve may readily cam thereinto. The annular body member may be made of free machining steel untreated, or it may be made of alloy steel known as 4140 heat-treated throughout its entire mass and tempered to render it hard and resilient. The main requirement of the annular body member 16 is that it should be sufficiently strong so that the internal annular cam surface 20 does not swell when the sleeve is forced thereinto. The hardened alloy steel sleeve provides a resilient hit-home feeling to the turning of the annular body member 16, which means that there is live resiliency stored in the solid end of the ring sleeve which gives positive assurance that the annular body member 16 will not shake loose or otherwise turn after the locking assembly is turned on tight. The enlarged fragmentary view in Figure 4 shows the threads under the forward end of the sleeve cammed into tight engagement with the threads 15, whereas the threads under the hexagonal head 21 remain with the customary thread clearance. That is to say, the Figure 4 is shown with the locking sleeve shown in its cammed and locking engagement position.

In Figure 5 I show a modification of the invention, and in this modification the solid contractible end 30 of the sleeve is integrally joined with a primary hexagonal nut 31. The solid contractible end 30 of the sleeve is adapted to cam into an internal annular cam surface 29 of a secondary hexagonal annular body member 28. In tightening the locking nut shown in Figure 5, it is only necessary for the operator to turn the primary hexagonal head 31 which forces the solid contractible end 30 of the sleeve into the internal annular cam surface 29 of the secondary hexagonal annular body member 28. The locking action of the solid contractible end 30 of the sleeve in Figure 5 is the same as that illustrated in Figures 1 to 4 previously described.

The Figure 6 is a modification of the arrangement shown in Figure 5, in that the secondary hexagonal annular body member 28 is now in the form of an actuating rod 34 in which the threadable element 35 operates as an adjusting screw for operating hydraulic or other actuating tripping equipment. The adjusting screw 35 is provided with male threads 36 which threadably engage female threads 37 within the actuating rod 34. The actuating rod 34 is provided with an internal annular cam surface 38 in which the solid contractible end of the sleeve 30 is adapted to be cammed. The primary hexagonal head 31 and the sleeve 30 is the same as that shown in Figure 5, and the locking engagement of the solid contractible end 30 of the sleeve is likewise the same as that shown in Figure 5.

In Figure 7 I show a further modified form of the invention, which comprises an elongated threadable element 42 having male threads thereon upon which my locking nut assembly is threadably mounted for longitudinal movement therealong for adjusting purposes. The solid end of the locking sleeve 44 is integrally joined with a primary hexagonal head 45. The locking sleeve 44 is adapted to cam into an internal annular cam surface 48 of a secondary hexagonal annular body 47. The secondary hexagonal annular body member 47 is provided with female threads 49 for engaging the male threads 43 so that when the two hexagonal members are screwed together on the threaded element 42 the locking sleeve 44 is cammed into the internal annular cam surface 48 of the secondary hexagonal annular body member 47. The camming of the locking sleeve 44 against the male threads 43 operates to prevent the locking assembly from becoming loose through vibration or other jarring action.

The locking sleeve in all the forms of the invention shown herein is constructed of steel or other metal capable of being hardenable throughout its entire mass to render it tough and resilient so that it resists collapsing when the locking nut is turned on tight. Even though the solid ring end portion 18 resists collapsing, yet the wall thickness thereof is sufficiently thin that it will shrink in diameter for engaging the threaded elements to provide a good locking engagement to prevent the locking nut from becoming loose under vibration. In other words, the solid forward end of the sleeve is made physically thin enough whereby it may cam or deflect inwardly to provide a good locking engagement notwithstanding the fact that the sleeve is made of hardenable steel or other metals and is heat treated to render it hard and resilient. Experience shows that the sleeve will spring back when the locking nut is released, to thereby enable the operator to unscrew the nut from the entire length of the threads without a dragging action. The sleeve may be made of any material so long as it has the physical property of camming in and yet having restored resiliency or life after the nut is unloosened or released. The sleeve is resilient and harder than the threaded element upon which the locking nut is threaded, whereby a good locking engagement or bite is effected to insure against the locking nut becoming loose under vibrations or other jolting operation of the machine.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim as my invention:

A resilient locking nut for a threaded element comprising an annular body member surrounding the threaded element and having an internal annular cam surface radially spaced from the threaded element, a resilient locking sleeve having a bore with female threads threadably engaging the threaded element and comprising a solid ring comprising enlarged annular head means, an intermediate annular longitudinal section with a substantially cylindrical outer surface and an annular resiliently contractible terminal end cam portion having an outer cam surface, the outer cam surface of the solid ring adapted for cam engagement with the internal annular cam surface of the annular body to contractibly cam the female thread at the terminal end portion into tight locking engagement with the threaded element, said solid ring making cam engagement with said internal annular cam surface only at the terminal end portion with the longitudinal section being unsupported by said internal annular cam surface, said sleeve being constructed of hardenable alloy spring steel heat treated and tempered throughout its entire mass to render it hard and resilent whereby the elastic limit of the solid ring at the terminal end portion in its contracted position will not be exceeded and whereby said solid ring at the terminal end portion will radially spring back from said tight locking engagement with said threaded element to a partially open contractible position upon release of said cam engagement, said terminal end portion in said partially open contractible position having a slightly greater internal radial dimension than the external radial dimension of said threaded element whereby the sleeve may be turned relatively easily with respect to said threaded element, said cam engagement at the terminal end portion transmitting substantially all the compressive load between the sleeve and the internal annular cam surface.

GEORGE V. WOODLING.

REFERENCES CITED

The following references are of record in the file of this patent:

UNITED STATES PATENTS

| Number | Name | Date |
|---|---|---|
| 526,308 | Garvin | Sept. 18, 1894 |
| 812,299 | Schmitt | Feb. 13, 1906 |
| 1,149,329 | Bong | Aug. 10, 1915 |
| 1,470,528 | Flentjen | Oct. 9, 1923 |
| 1,639,407 | Hutton | Aug. 16, 1927 |
| 1,640,650 | Ehrhardt | Aug. 30, 1927 |
| 1,891,358 | Pickop | Dec. 20, 1932 |
| 2,188,356 | Jeans | Jan. 30, 1940 |
| 2,266,961 | Desbrueres | Dec. 23, 1941 |
| 2,472,872 | Woodling | June 14, 1949 |

FOREIGN PATENTS

| Number | Country | Date |
|---|---|---|
| 6,152 | Australia | Feb. 25, 1927 |
| 475,334 | Great Britain | Nov. 17, 1937 |